Figure 1:
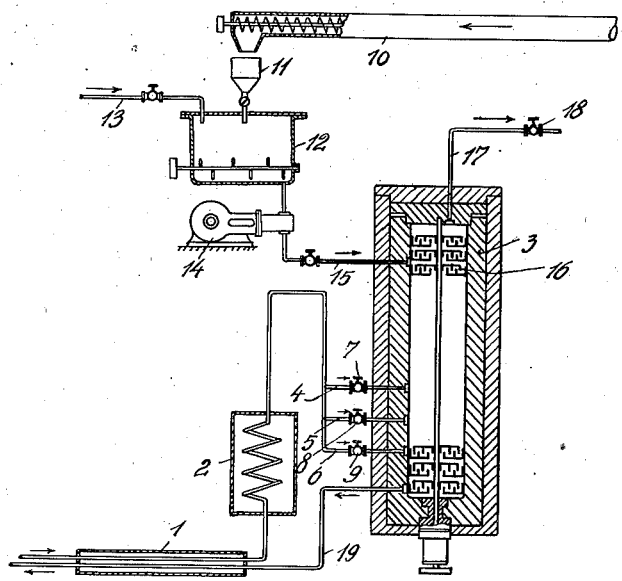

Oct. 20, 1936.  T. W. PFIRRMANN  2,057,971

METHOD OF HYDROGENATING CARBONACEOUS MATERIALS

Filed March 19, 1934

Inventor:
Theodor Wilhelm Pfirrmann
by Karl Michaelis
Atty.

Patented Oct. 20, 1936

2,057,971

UNITED STATES PATENT OFFICE 2,057,971

METHOD OF HYDROGENATING CARBONACEOUS MATERIALS

Theodor Wilhelm Pfirrmann, Castrop-Rauxel, Germany, assignor to Friedrich Uhde Ingenieur-Buro, Dortmund, Germany Application March 19, 1934, Serial No. 716,423
In Germany March 20, 1933

3 Claims. (Cl. 196—53)

The present invention relates to the hydrogenation of solid or fluid carbonaceous material with a view to converting same into valuable and more especially low-boiling hydrocarbons. It has particular reference to the method in which hydrogen in a particularly active form, i. e. nascent hydrogen, is made to act on the raw material.

It is an object of my invention to provide means whereby the hydrogenation of carbonaceous material by means of nascent hydrogen can be carried out in a more efficient manner than was hitherto possible.

It has repeatedly been suggested to develop the hydrogen required for hydrogenation in the vessel or the chamber in which the hydrogenation reaction takes place. More especially nascent hydrogen has been developed in the reaction vessel by acting with iron on water or steam. However, the methods hitherto devised for effecting this, involve the drawback that under the conditions of reaction required in order to obtain a good yield, the production of hydrogen proceeds too slowly. If an intimate mixture of the raw material with finely divided spongy metal and water is caused to react in a pressure resisting vessel at a temperature of say 450° C., where substantial decomposition takes place, the pressure rising in proportion to the space in the vessel filled with liquid, for instance to about 200 atms., a good yield is obtained in a comparatively short time. However, this mode of operation, in order to be fully successful, requires operating within comparatively narrow conditions of temperature and pressure, which are not always desirable for every kind of raw material.

It has been found that the favorable effect obtained in the process as described is mainly due to the peculiar state in which, under the conditions of operation mentioned above, the water will act on the finely divided iron. Under the conditions above recited (a temperature of about 450° C. and a pressure of about 200 atms.) the water will be substantially in the critical or supercritical state. In Ullmann's "Enzyklopädie der technischen Chemie" 2nd edition, vol. 6, p. 812 to 813, the critical temperature of a solid or fluid material is defined as being the temperature at which the solid or liquid can only exist in the gas phase and the vapor tension of a liquid at its critical temperature is defined as its critical pressure. In Landolt-Börnstein, "Physikalisch-Chemische Tabellen" (5th edition) the critical temperature of water is shown to lie within the range of 358.1° to 374° C., the critical pressure between 194.6 and 217.5 atms. Obviously the desired reaction between water and metal on the one hand and between the material to be hydrogenated and the nascent hydrogen on the other hand proceeds in the fluid mixture, comprising the carbonaceous materials to be hydrogenated, the water and the solid metal particles. Fluid mixtures of this kind, when heated to a temperature approaching or surpassing the critical temperature, exhibit peculiar phenomena, such as for instance the formation of stable foams. In this state, the water is particularly reactive and therefore owing to the powerful action exerted by the water on the metal, such as iron, nascent hydrogen will be formed with such velocity of reaction that sufficient quantities of nascent hydrogen are made available for combination with the products of decomposition of the carbonaceous material.

It has been proposed in the U. S. Patent No. 1,936,819 to Bayer, for example, to convert carbonaceous materials to form lower boiling hydrocarbon oils wherein such a material is heated in a closed reaction zone in the presence of water and of at least one finely divided metal capable of reacting with said water with the production of nascent hydrogen in situ; the said reaction zone being heated to temperatures above the critical temperature of water, thereby liberating hydrogen from the water and building up within the reaction zone a self-generated pressure adequate to hydrogenate a substantial proportion of said carbonaceous materials and sufficient to prevent substantial vaporization of said carbonaceous material.

According to the present invention, instead of heating the water in the reaction zone, water or steam developed therefrom is supplied to the reaction zone in a state approaching or exceeding the critical state.

This mode of operation has proved to be particularly useful in those cases where the heating of the water in the reaction zone is not recommendable, for instance in the case where the heat energy liberated in the reaction does not suffice to maintain the required reaction temperature, so that heat must be supplied to the reaction zone from without.

In these or other cases the water or steam may be supplied either partly or altogether in a state approaching or corresponding to the critical state or even exceeding it. It has been found that this way of supplying heat energy is useful in the case, where a raw material is subjected to hydrogenation, which requires only small quantities of hydrogen in the reaction. If in this case, the method described in the beginning were applied, only small quantities of water and metal would participate in the reactions and in consequence thereof the exothermic heat of reaction of the metal-water reaction would not suffice to maintain the required hydrogenation temperature within the reaction system, so that heating from without would have to be resorted to, which, however, might lead to local superheating.

The present invention thus offers the advantage that in all cases where the formation of hydrogen occurs under endothermic or only slightly exothermic conditions, the heat energy required in the reaction can be easily supplied by way of the water if in the supercritical state. In this manner, undesirable overheating of the carbonaceous material undergoing treatment, which overheating cannot easily be prevented when supplying heat to the reaction zone from without the ordinary way, such as directly heating the reaction vessel, is altogether obviated and at the same time the formation of hydrogen is sufficiently accelerated.

The new mode of operation is particularly applicable in those cases, where the production of nascent hydrogen takes place by acting with water on carbon or on metals, such as for instance copper or tin, which develop little heat in the reaction. As shown by the process of producing watergas, the reaction between water and carbon is a highly endothermic one, so that if this reaction should be used for producing nascent hydrogen in a hydrogenation process, considerable quantities of heat energy would have to be supplied from without. According to the present invention this heat energy can be supplied with the water or steam to be introduced into the reaction vessel.

In the operation of this invention, one may proceed for instance as follows:

*Example 1*

450 parts by weight of water are forced by pumping into a reaction vessel, which is provided with agitating means and in which the temperature is maintained at about 460° C., care being taken to avoid a drop of temperature. The pressure in the vessel is allowed to rise to 238 atms. A mixture of 1200 parts by weight of a topped crude, boiling above 300° C. and containing 2.3% of sulphur, 15 parts by weight of saturated magnesium-chloride solution and 1000 part by weight of a spongy metal mixture consisting of 850 parts by weight of tin, 20 parts by weight of nickel and 50 parts by weight of carbon, the remainder being metal oxides, is forced into the same vessel, in which the water is now converted into a froth. While the mixture is being forced into the reaction vessel, the pressure slowly rises to 300 atms., the temperature being kept constant for about an hour with continuous stirring. There are obtained 101% by volume (based on the topped crude) of a reaction product, 61.8% of which boil up to 300° C. and contain only 0.09% of sulphur.

*Example 2*

470 parts by weight of an aqueous solution containing 4% of magnesium-chloride and 1% of cerium-chloride is forced through a pipe or coil heated to about 450° C. into one end of a pressure resisting reaction vessel in which a temperature of about 450° C. is maintained. A mixture of 1200 parts by weight of a cracked residue (specific gravity 1.01) obtained from a Hanover crude oil and 1000 parts by weight of spongy iron containing about 5% of nickel sulfide and 8% of carbon are simultaneously forced into the same vessel. The mixture is kept in motion by an agitator and is continuously removed from the other end of the vessel, while a pressure of 300 atms. is maintained. After separation of the solid constituents from the reaction products issuing from the vessel, there are obtained 99.8% by volume of a hydrogenated product of 0.893 specific gravity containing 26% by weight of gasoline and 28% by weight of light oil boiling up to 300° C. The residue boiling above 300° C. shows a specific gravity of about 1.01, which specific gravity is similar to that of the starting material. This residue is suitable for the production of valuable lubricating oils.

In the drawing affixed to this specification and forming part thereof, an apparatus adapted for use in carrying out the process of the present invention is illustrated diagrammatically by way of example.

Figure 2:
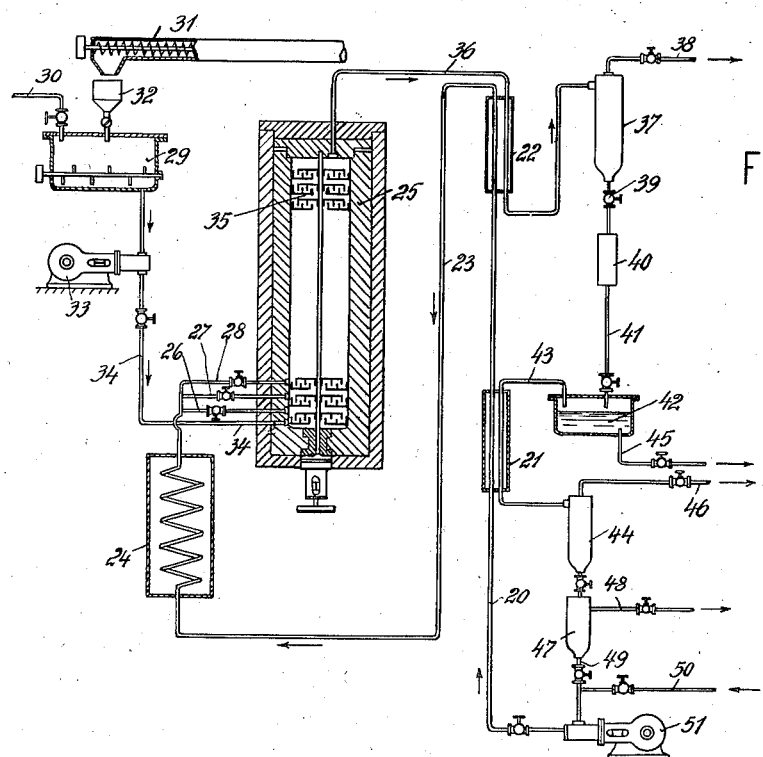

In the drawing Figs. 1 and 2 are diagrams of two forms of apparatus.

Referring to the drawing and first to Fig. 1, 1 is a heat exchanger, through which the water required for the reaction is forced by means of a pump (not shown) into a preheater or superheater 2, wherein it is brought to a supercritical state as regards temperature and pressure before being passed into the reaction vessel 3 through one or more pipes 4, 5, and 6 provided with valves 7, 8, and 9, respectively. A mixture of carbon and finely divided metal is supplied from a conveyer 10 and charging hopper 11 to a mixer 12, to be mixed therein with the material to be hydrogenated, for instance an oil supplied through pipe 13. A pump 14 serves for forcing the mixture of carbon, metal and oil into the reaction vessel 3 through a pipe 15. The reaction vessel 3 is equipped with a stirrer 16, arranged in such manner that the mixture conveyed by the pump 14 is caused to slowly descend through the vessel, while the steam or water in supercritical state admitted through any of the pipes 4, 5, and 6 rises through the vessel 3 in countercurrent to the descending mixture. In the reaction vessel the water or steam acts in countercurrent on the carbonaceous material and finely divided metal with resultant generation of nascent hydrogen, which combines with the products forming in the decomposition of the oil to yield hydrogenation products. Any steam that rises to the top of the vessel without undergoing decomposition together with gaseous and vaporous reaction products are removed from the vessel 3 through pipe 17 controlled by valve 18 or other suitable means.

The hydrocarbon products which remain liquid at the temperature and pressure of reaction may be withdrawn from the reaction vessel through pipe 19 together with any solid substances collecting in the lower part of the vessel 3. The liquid and solid products may pass through the heat exchanger 1 thereby supplying heat to the fresh water. The gases and vapors escaping from the top of the vessel through pipe 17 may be made to pass through another heat exchanger (not shown) in order to exchange heat with the mixture of oil and carbon forced by the pump 14 to the reaction zone. The vapors of low-boiling hydrocarbons may be separated from the gases of the process in any well known manner. The liquid products withdrawn through pipe 19 may, after separation of solid constituents, either be returned to the reaction vessel or may be treated further for the production of lubricants, liquid fuel or the like.

By operating as above described, except for using carbon alone instead of carbon and finely divided metal any separation of the non-consumed carbon from the high-boiling hydrogenation products may be dispensed with in all cases where these products are to be returned in cycle into the reaction vessel. If finely divided metal is added to the carbon, any sulphur present in the carbonaceous material to be treated will react with the metal, whereby the formation of corrosive sulphur compounds is prevented and the separation of metal compounds formed from the high boiling hydrogenation products is advisable. This mode of operation is particularly suitable for the treatment of raw material rich in sulphur.

The same mode of operation is, however, also applicable in case, where the nascent hydrogen is developed by the interaction of water and finely divided metals only, it being then necessary to treat the mixture removed through pipe 19 for the purpose of separating the solid and fluid reaction constituents, which separation may be effected in centrifugals or the like.

If the raw material to be hydrogenated requires larger quantities of hydrogen, it may happen that in the case where the formation of hydrogen occurs under increased endothermic conditions, for instance in the reaction of water substantially with carbon, the supply of all the heat energy required in the reactions merely through that quantity of steam which is stoichiometrically required will not be possible without difficulties. In such case, steam in excess of the required amount should be supplied and the excess of water or steam should be kept circulating. In this case any required quantities of heat energy can be introduced into the reaction vessel with the lowest possible differences or drop of temperature.

An apparatus for carrying out the hydrogenation process under these conditions is illustrated in Fig. 2. In this figure, 20 is a feed line for water, through which water passes to the heat exchangers 21 and 22 to be preheated therein; the water is then passed through pipe 23 to the superheater 24, in which it is heated to a high temperature, such as 460° C. under a high pressure of the order of 200 atms. or substantially more. The steam thus brought to the supercritical state is now supplied to the reaction vessel 25 through any of the pipes 26, 27 or 28, each of said pipes being provided with a control valve. The carbonaceous raw material to be hydrogenated, for instance residues from distillation or cracking, is supplied to the mixer 29 through pipe 30, a conveyer 31 feeding carbon with or without suitable finely divided metals through the hopper 32 into the mixer 29. The mixture after having been preheated, for instance by heat exchange with part of the products escaping from the reaction vessel, is forced by pump 33 through pipe 34 into the bottom part of the reaction vessel 25, which is provided with agitating or stirring means 35. The steam passes upwardly the reaction vessel together with the raw material and the carbon and the finely divided metal, if present, and the nascent hydrogen generated by the interaction between the steam and carbon or carbon and metal combines with the material undergoing conversion; the gases and vapors formed in these reactions are removed from the upper part of the reaction vessel through pipe 36, together with the fluid hydrocarbons and, after having passed through the heat exchanger 22, enter a separator 37. The temperature conditions in the heat exchanger 22 are preferably so controlled that in the separator 37 water and motor fuel like fractions and any heavier reaction products are separated from lower boiling hydrocarbons and gases which escape through pipe 38. The liquid and solid matter is withdrawn from the separator 37 through a pipe and valve 39 into a pressure releasing device 40 and expanded therefrom through pipe 41 into another separator 42. Steam, gases and substantially the motorfuel like fraction are separated in gaseous or vaporous form respectively in the separator 42 and are removed therefrom through pipe 43 and heat exchanger 21 into the separator 44, while the heavier hydrocarbons and solid substances are removed from the separator 42 through outlet 45. The separation of these products into light hydrocarbons, heavy hydrocarbons and solid matter may be effected as usual in centrifugals, presses and the like, and any of these products may, if desired, be returned to the process to undergo further treatment. The gases and vapors passing from pipe 43 through the heat exchanger 21 are cooled down therein and motorfuel like products and water are separated as liquids in the receiver 44 from any gases not previously removed, which leave the system through pipe 46. The motorfuel like products and water from the receiver 44 are separated in another separator 47 in such manner that the light hydrocarbon product can be withdrawn through a pipe 48, while the water collects in the bottom of the separator 47 and may be returned therefrom through pipe 49 together with fresh water from a supply pipe 50, the water being forced into the system by means of pump 51.

The method above described can be applied in all cases, in which nascent hydrogen is to be developed in the reaction zone, for instance by acting with water or steam on metals, metal oxides, carbides, hydrocarbons, carbon-monoxide or carbon.

The term "critical state" used in the claims is intended to include a state approaching or exceeding the critical state.

Various changes may be made in the details disclosed in the foregoing specification without departing from the invention or sacrificing the advantage thereof.

In the claims affixed to this specification no selection of any particular modification of the invention is intended to the exclusion of other modifications thereof and the right to subsequently make claim to any modification not covered by these claims is expressly reserved.

I claim:—

1. In the process of converting carbonaceous materials to form lower boiling hydrocarbon oils wherein such material is heated in a closed reaction zone in the presence of water and of at least one finely divided metal capable of reacting with said water with the production of nascent hydrogen in situ; the said reaction zone being heated to temperatures above the critical temperature of water, thereby liberating hydrogen from the water and building up within the reaction zone a self-generated pressure adequate to hydrogenate a substantial proportion of said carbonaceous materials and sufficient to prevent substantial vaporization of said carbonaceous material; the improvement which comprises heating said water outside of said reaction zone to temperatures not substantially below the temperature of said reaction zone and under pressures above its critical pressure, and passing said heated water separately into said reaction zone at a point different from the point of introduction of said carbonaceous materials.

2. In the process of converting carbonaceous materials to form lower boiling hydrocarbon oils wherein such material is heated in a closed reaction zone in the presence of water and of at least one finely divided metal capable of reacting with said water with the production of nascent hydrogen in situ; the said reaction zone being heated to temperatures above the critical temperature of water, thereby liberating hydrogen from the water and building up within the reaction zone a self-generated pressure adequate to hydrogenate a substantial proportion of said carbonaceous materials and sufficient to prevent substantial vaporization of said carbonaceous material; the improvement which comprises heating said water outside the reaction zone to a temperature not substantially below its critical temperature and under a pressure above its critical pressure, and passing said heated water into said reaction zone at a plurality of different points.

3. In the process of converting carbonaceous materials to form lower boiling hydrocarbon oils wherein such material is heated in a closed reaction zone in the presence of water and of at least one finely divided metal capable of reacting with said water with the production of nascent hydrogen in situ; the said reaction zone being heated to temperatures above the critical temperature of water, thereby liberating hydrogen from the water and building up within the reaction zone a self-generated pressure adequate to hydrogenate a substantial proportion of said carbonaceous materials and sufficient to prevent substantial vaporization of said carbonaceous material; the improvement which comprises feeding a mixture of said carbonaceous material and said finely divided metal into said reaction zone at an intermediate point, passing water heated to a temperature not substantially below the temperature of said reaction zone and under a pressure above its critical pressure into said reaction zone at a point below the point of introduction of said mixture, withdrawing gaseous reaction products from the top of said reaction zone and withdrawing liquid and solid reaction products at the bottom of said reaction zone.

THEODOR WILHELM PFIRRMANN.